US012255392B2

(12) United States Patent
Su et al.

(10) Patent No.: US 12,255,392 B2
(45) Date of Patent: Mar. 18, 2025

(54) WIDEBAND ANTENNA SYSTEM

(71) Applicant: ASUSTeK COMPUTER INC., Taipei (TW)

(72) Inventors: Chun-Chieh Su, Taipei (TW); Wei-Cheng Lo, Taipei (TW); Chien-Ming Hsu, Taipei (TW); Che-Yen Lin, Taipei (TW); Chuan-Chien Huang, Taipei (TW)

(73) Assignee: ASUSTEK COMPUTER INC., Taipei (TW)

(*) Notice: Subject to any disclaimer, the term of this patent is extended or adjusted under 35 U.S.C. 154(b) by 207 days.

(21) Appl. No.: 18/180,974

(22) Filed: Mar. 9, 2023

(65) Prior Publication Data

US 2024/0063535 A1 Feb. 22, 2024

(30) Foreign Application Priority Data

Aug. 22, 2022 (TW) ................................. 111131574

(51) Int. Cl.
*H01Q 1/24* (2006.01)
*H01Q 1/48* (2006.01)
(Continued)

(52) U.S. Cl.
CPC ............... *H01Q 1/50* (2013.01); *H01Q 1/243* (2013.01); *H01Q 1/48* (2013.01); *H01Q 5/328* (2015.01);
(Continued)

(58) Field of Classification Search
CPC ........ H01Q 1/243; H01Q 5/328; H01Q 5/335; H01Q 5/50; H01Q 9/42
See application file for complete search history.

(56) References Cited

U.S. PATENT DOCUMENTS 6,529,749 B1 * 3/2003 Hayes .................... H01Q 9/065 343/702
10,122,399 B2 11/2018 Tai
(Continued)

FOREIGN PATENT DOCUMENTS

CN 104051853 A 9/2014
CN 107124196 B 11/2019
CN 111092295 A 5/2020

*Primary Examiner* — Daniel Munoz
(74) *Attorney, Agent, or Firm* — McClure, Qualey & Rodack, LLP

(57) ABSTRACT

A wideband antenna system includes a first metal radiation portion, having a coupling distance with a second metal radiation portion; a first feeding contact and a second feeding contact, electrically connected to the first metal radiation portion and the second metal radiation portion respectively, and close to the coupling distance; a first ground contact, electrically connected to the second metal radiation portion; a second ground contact, electrically connected to the first metal radiation portion; an impedance tuner, electrically connected to the first feeding contact, the second feeding contact, the first ground contact, the second ground contact, and a radio frequency signal source, to switch the first metal radiation portion and the second metal radiation portion; an aperture contact, electrically connected to the first metal radiation portion; and an aperture tuner, electrically connected to the aperture contact.

11 Claims, 12 Drawing Sheets

(51) Int. Cl.

| | |
|---|---|
| ***H01Q 1/50*** | (2006.01) |
| ***H01Q 5/328*** | (2015.01) |
| ***H01Q 5/335*** | (2015.01) |
| ***H01Q 5/50*** | (2015.01) |
| ***H01Q 9/42*** | (2006.01) |

(52) U.S. Cl.
CPC ............... *H01Q 5/335* (2015.01); *H01Q 5/50* (2015.01); *H01Q 9/42* (2013.01)

(56) References Cited

U.S. PATENT DOCUMENTS

| | | | |
|---|---|---|---|
| 2016/0036127 | A1 | 2/2016 | Desclos et al. |
| 2018/0028725 | A1 | 2/2018 | Tooren et al. |
| 2018/0287259 | A1 | 10/2018 | Svendsen et al. |
| 2020/0044311 | A1* | 2/2020 | Gu ......................... H01Q 21/28 |
| 2021/0050669 | A1 | 2/2021 | Cha et al. |
| 2021/0273340 | A1* | 9/2021 | Sun .......................... H01Q 5/10 |

* cited by examiner

WIDEBAND ANTENNA SYSTEM

CROSS-REFERENCE TO RELATED APPLICATIONS

This application program claims the priority benefit of Taiwan application serial NO. 111131574, filed on Aug. 22, 2022. The entirety of the above-mentioned patent applications is hereby incorporated by reference herein and made a part of the specification.

BACKGROUND OF THE DISCLOSURE

Field of the Invention

The disclosure relates to a wideband antenna system that effectively uses a coupled radiator.

Description of the Related Art

In the existing consumer electronic products, the frequency band of an antenna design has evolved from the previous 2G/3G/4G to 5G, and the frequency band of 6G has also been developed from supporting 2.4G/5G in WIFI communication. The above operating frequencies are roughly divided into a low frequency band (617 MHz-960 MHz), an intermediate frequency band (1475 MHz-2170 MHz), a high frequency band (2300 MHz-2700 MHz), an ultrahigh frequency band (3300 MHz-5000 MHz), a WIFI 5G frequency band (5150 MHz-5850 MHz), and a WIFI 6E frequency band (5925 MHz-7125 MHz). In the previous antenna design, it is relatively difficult to cover all the above frequency bands to one antenna, and therefore the antenna is usually split to support different frequency bands. However, with the support of communication technologies such as a multi-input multi-output (MIMO) technology, a carrier aggregation (CA) technology, and an E-UTRA-NR dual connectivity (EN-DC) technology, the quantity of antennas is greatly increased, which is difficult to achieve in a limited space. Therefore, it is often necessary to sacrifice the performance of some antennas to meet the requirements, especially for handheld electronic products that have the relatively smallest space but need to support the most functions among electronic products. Therefore, a wideband antenna design is required.

In order to achieve the wideband antenna design, an antenna impedance tuner or an antenna aperture tuner are usually introduced, so that a plurality of frequency bands is covered on the same antenna. However, most of the existing antenna designs only provide support at a fixed frequency, and even if there is a way to support the wideband, the radiation efficiency of some frequency bands is sacrificed, and not all frequency bands are taken into consideration.

BRIEF SUMMARY OF THE INVENTION

According to an aspect of this disclosure, a wideband antenna system is provided. The wideband antenna system includes a first metal radiation portion, a second metal radiation portion, a first feeding contact, a second feeding contact, a first ground contact, a second ground contact, an impedance tuner, an aperture contact, and an aperture tuner. The second metal radiation portion has a coupling distance with the first metal radiation portion, so that there is a coupling capacitor between the first metal radiation portion and the second metal radiation portion. The first feeding contact is electrically connected to the first metal radiation portion and close to the coupling distance, and the first feeding contact is electrically connected to a radio frequency signal source. The second feeding contact is electrically connected to the second metal radiation portion and close to the coupling distance. The first ground contact is electrically connected to the second metal radiation portion, and the second ground contact is electrically connected to the first metal radiation portion. The impedance tuner is electrically connected to the first feeding contact, the second feeding contact, the first ground contact, the second ground contact, and the radio frequency signal source, to switch the first metal radiation portion and the second metal radiation portion. The aperture contact is electrically connected to the first metal radiation portion, so that the second ground contact is located between the first feeding contact and the aperture contact, and the aperture tuner is electrically connected to the aperture contact.

In summary, the disclosure is a wideband antenna system, which effectively uses an adjacent metal radiation portion as a wideband design, to make different use of the metal radiation portion according to requirements of different frequency bands, so that a good antenna radiation efficiency is provided in the supported frequency bands. Therefore, the wideband antenna system of the disclosure obtains a wideband effect by circuit switching, which effectively supports a bandwidth of 617-7125 MHz and provides good radiation efficiency, thereby reducing the quantity of antennas in electronic products.

DESCRIPTION OF EMBODIMENTS

Figure 1:
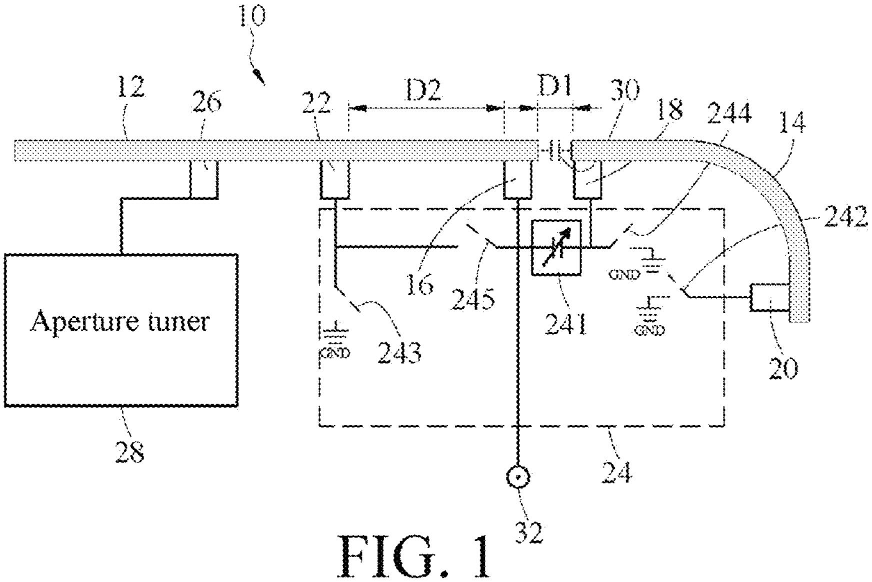
FIG. 1 is a schematic architectural diagram of a wideband antenna system according to an embodiment of the disclosure.

Embodiments of the disclosure are described with reference to relevant drawings. In addition, some components or structures are omitted from the drawings in the embodiments, to clearly show the technical features of the disclosure. The same reference numbers in the drawings represent the same or similar components or circuits. It should be understood that although terms such as "first" and "second" in this specification are used for describing various elements, components, regions, or functions, the elements, components, regions, or functions are not limited by the terms. The terms are only used to distinguish one element, component, region, or function from another element, component, region, or function.

Referring to FIG. 1, a wideband antenna system 10 includes a first metal radiation portion 12, a second metal radiation portion 14, a first feeding contact 16, a second feeding contact 18, a first ground contact 20, a second ground contact 22, an impedance tuner 24, an aperture contact 26, and an aperture tuner 28. In the wideband antenna system 10, the first metal radiation portion 12 is located on one side of the second metal radiation portion 14, and there is a coupling distance D1 between the first metal radiation portion 12 and the second metal radiation portion 14, so that there is a coupling capacitor 30 between the first metal radiation portion 12 and the second metal radiation portion 14, to use the first metal radiation portion 12 as a main radiator and use the second metal radiation portion 14 as a coupled radiator. The first feeding contact 16 is electrically connected to one end of the first metal radiation portion 12 and close to the coupling distance D1. The first feeding contact 16 is electrically connected to a radio frequency signal source 32. The second feeding contact 18 is electrically connected to one end of the second metal radiation portion 14 and close to the coupling distance D1. The first ground contact 20 is electrically connected to an other end of the second metal radiation portion 14, and the second ground contact 22 is electrically connected to the first metal radiation portion 12. The impedance tuner 24 is electrically connected to the first feeding contact 16, the second feeding contact 18, the first ground contact 20, the second ground contact 22, and the radio frequency signal source 32, to switch the first metal radiation portion 12 and the second metal radiation portion 14 using a circuit inside the impedance tuner 24, to achieve a wideband effect. The aperture contact 26 is also electrically connected to the first metal radiation portion 12, so that the second ground contact 22 is located between the first feeding contact 16 and the aperture contact 26. The aperture tuner 28 is electrically connected to the aperture contact 26 to switch a ground path.

As shown in FIG. 1, the impedance tuner 24 used in the wideband antenna system 10 further includes a variable capacitor 241, a first switch 242, a second switch 243, a third switch 244, and a fourth switch 245. In the impedance tuner 24, the variable capacitor 241 is electrically connected to the first feeding contact 16 and the second feeding contact 18, to connect the coupling capacitor 30 between the first metal radiation portion 12 and the second metal radiation portion 14 in parallel using the variable capacitor 241. The first switch 242 is electrically connected between the first ground contact 20 and a ground terminal GND to selectively connect the first ground contact 20 to the ground terminal GND. The second switch 243 is electrically connected between the second ground contact 22 and the ground terminal GND to selectively connect the second ground contact 22 to the ground terminal GND. The third switch 244 is electrically connected between the second feeding contact 18 and the ground terminal GND to selectively connect the second feeding contact 18 to the ground terminal GND. The fourth switch 245 is electrically connected between the second ground contact 22 and the radio frequency signal source 32 to selectively connect the second ground contact 22 to the radio frequency signal source 32. When the fourth switch 245 is turned on and the second ground contact 22 is connected to the radio frequency signal source 32, the second ground contact 22 is used as a feeding contact, so that the wideband antenna system 10 achieves a form of double-feeding using functions of the first feeding contact 16 and the second ground contact 22.

In an embodiment, a distance D2 between the first feeding contact 16 and the second ground contact 22 is a distance of 0.05 to 0.025 times a wavelength of a lowest operating frequency.

In an embodiment, referring to FIG. 1, the first metal radiation portion 12 and the second metal radiation portion 14 are a metal frame of an electronic device, or a metal plane attached to an electronic device. In an embodiment, the first metal radiation portion 12 and the second metal radiation portion 14 are metal portions or metal strips inside a metal case of the electronic device or a plastic case of the electronic device. The first metal radiation portion 12 and the second metal radiation portion 14 are vary as an application of the wideband antenna system 10. As shown in FIG. 1, the second metal radiation portion 14 is bent in cooperation with a frame bending portion of the electronic device. In another embodiment, the second metal radiation portion 14 is also designed as a straight segment.

In an embodiment, the electronic device is a mobile phone, a personal digital assistant, a tablet computer, or a notebook computer, and any portable electronic device with a mobile communication function is covered in the disclosure.

Figure 2A:
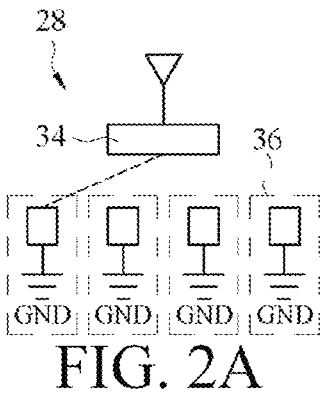
FIG. 2A to FIG. 2D are schematic circuit diagrams of an aperture tuner according to an embodiment of the disclosure.
Figure 2B:
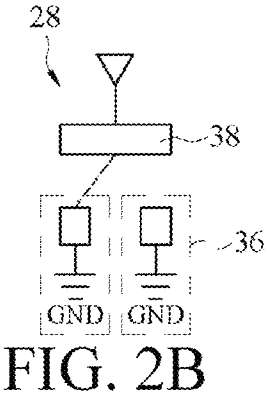

In an embodiment, the aperture tuner 28 further includes a switch module and a plurality of ground paths, to be switched by the switch module to select one of the ground paths, and the ground path includes at least one of an open circuit ground path and at least one passive component ground path, and a zero-ohm resistor ground path. Referring to FIG. 2A, the switch module in the aperture tuner 28 is a single pole four throw (SP4T) switch 34, and the SP4T switch 34 is connected to four ground paths 36. Each ground path 36 includes a passive component, an open circuit, or a zero-ohm resistor connected to the ground terminal, to form a passive component ground path, an open circuit ground path, or a zero-ohm resistor ground path respectively. In this embodiment, the four ground paths 36 include one open circuit ground path, two passive component ground paths, and one zero-ohm resistor ground path. Referring to FIG. 2B, the switch module in the aperture tuner 28 is at least one single pole double throw (SPDT) switch 38, and the SPDT switch 38 is connected to two ground paths 36. Each ground path 36 includes a passive component, an open circuit, or a zero-ohm resistor connected to the ground terminal GND, to form a passive component ground path, an open circuit ground path, or a zero-ohm resistor ground path respectively. In this embodiment, the two ground paths include one open circuit ground path or one passive component ground path, and one zero-ohm resistor ground path.

Figure 2C:
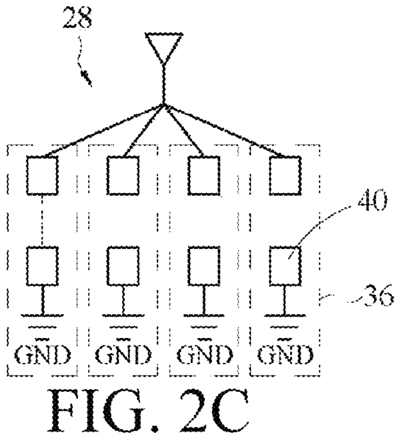
Figure 2D:
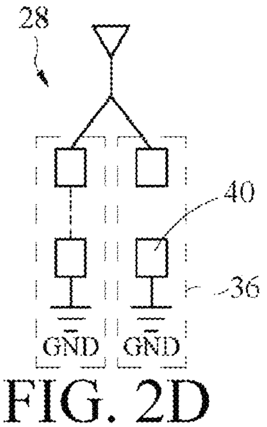

In an embodiment, the aperture tuner 28 further uses a plurality of single pole single throw (SPST) switches 40 to switch the ground path 36. Referring to FIG. 2C, the switch module in the aperture tuner 28 is four single pole single throw (SPST) switches 40, and each SPST switch 40 is connected to one ground path 36. Each ground path 36 includes a passive component, an open circuit, or a zero-ohm resistor connected to the ground terminal GND through the SPST switch 40, to form a passive component ground path, an open circuit ground path, or a zero-ohm resistor ground path respectively. In this embodiment, the four ground paths include one open circuit ground path, two passive component ground paths, and one zero-ohm resistor ground path. Referring to FIG. 2D, the switch module in the aperture tuner 28 is two single pole single throw (SPST) switches 40, and each SPST switch 40 is connected to one ground path 36. Each ground path 36 includes a passive component, an open circuit, or a zero-ohm resistor connected to the ground terminal GND through the SPST switch 40, to form a passive component ground path, an open circuit ground path, or a zero-ohm resistor ground path respectively. In this embodiment, the two ground paths 36 include one open circuit ground path or one passive component ground path, and one zero-ohm resistor ground path.

In an embodiment, the passive component ground path is a capacitor ground path, an inductor ground path, or a resistor ground path.

Figure 3:
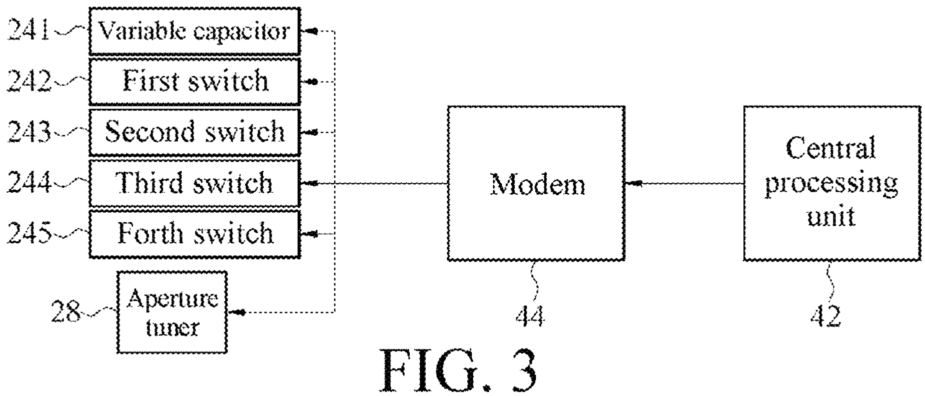
FIG. 3 is a schematic block diagram of action controlled by a central processing unit according to an embodiment of the disclosure.

In an embodiment, referring to FIG. 1 and FIG. 3 together, the variable capacitor 241, the first switch 242, the second switch 243, the third switch 244, and the fourth switch 245 in the aperture tuner 28 and the impedance tuner 24 are controlled by a central processing unit (CPU) 42. The CPU 42 generates a corresponding mobile industry processor interface (MIPI) control signal according to a requirement of an antenna frequency band. The MIPI control signal is transmitted to the aperture tuner 28, the first switch 242, the second switch 243, the third switch 244, and the fourth switch 245 through a modem 44 to control on and off of all the switches, and the MIPI control signal is also transmitted to the variable capacitor 241 through the modem 44 to control a capacitance value of the variable capacitor 241.

Figure 4:
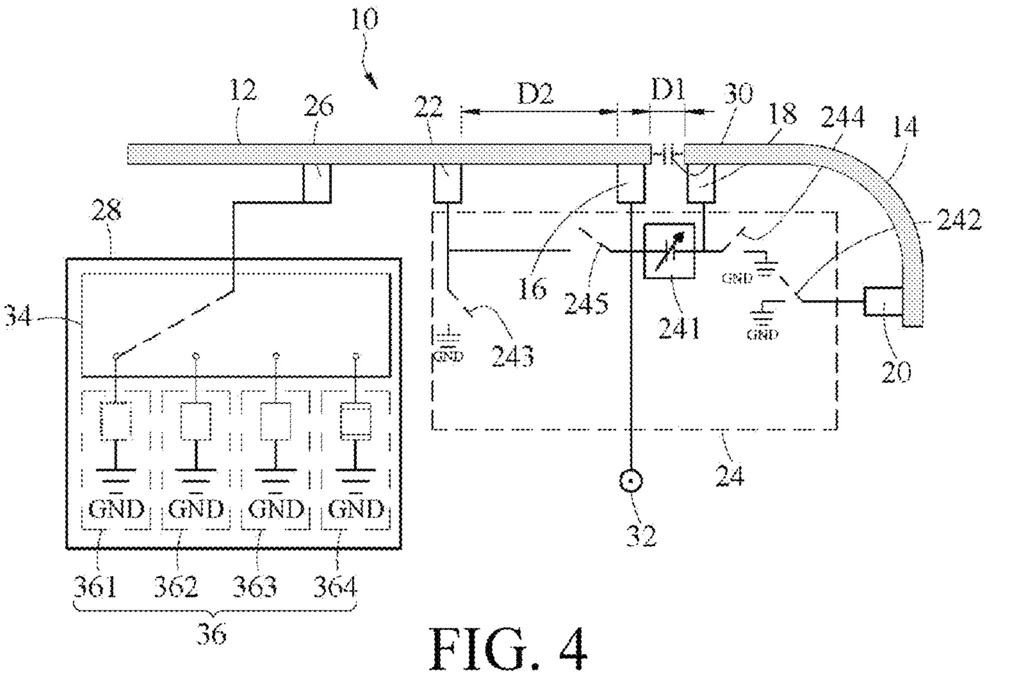
FIG. 4 is a schematic circuit diagram of a wideband antenna system in an operating state according to an embodiment of the disclosure.

The following further describes details of the wideband antenna system 10. Referring to FIG. 1 and FIG. 4 together, in this embodiment, the aperture tuner 28 in the wideband antenna system 10 uses a single pole four throw (SP4T) switch 34, and the SP4T switch 34 is connected to four ground paths 36: one open circuit ground path 361, two passive component ground paths 362 and 363, and one zero-ohm resistor ground path 364.

Figure 5:
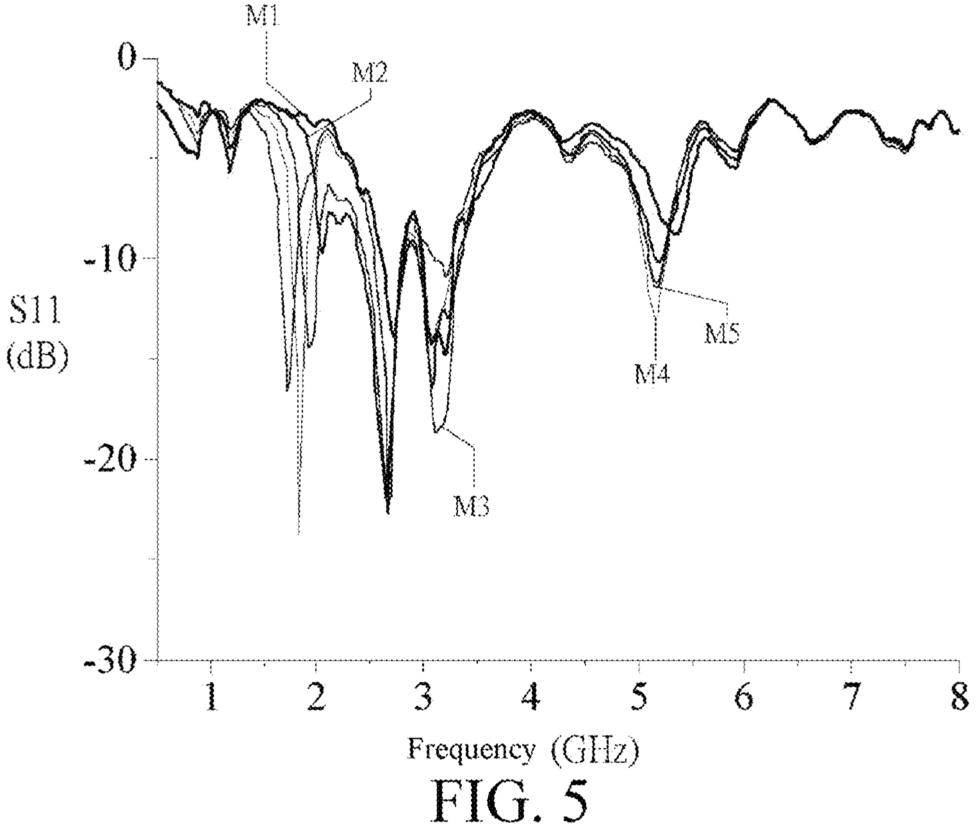
FIG. 5 is a schematic simulation diagram of an S-parameter of a wideband antenna system from a first operating state to a fifth operating state according to an embodiment of the disclosure.
Figure 6:
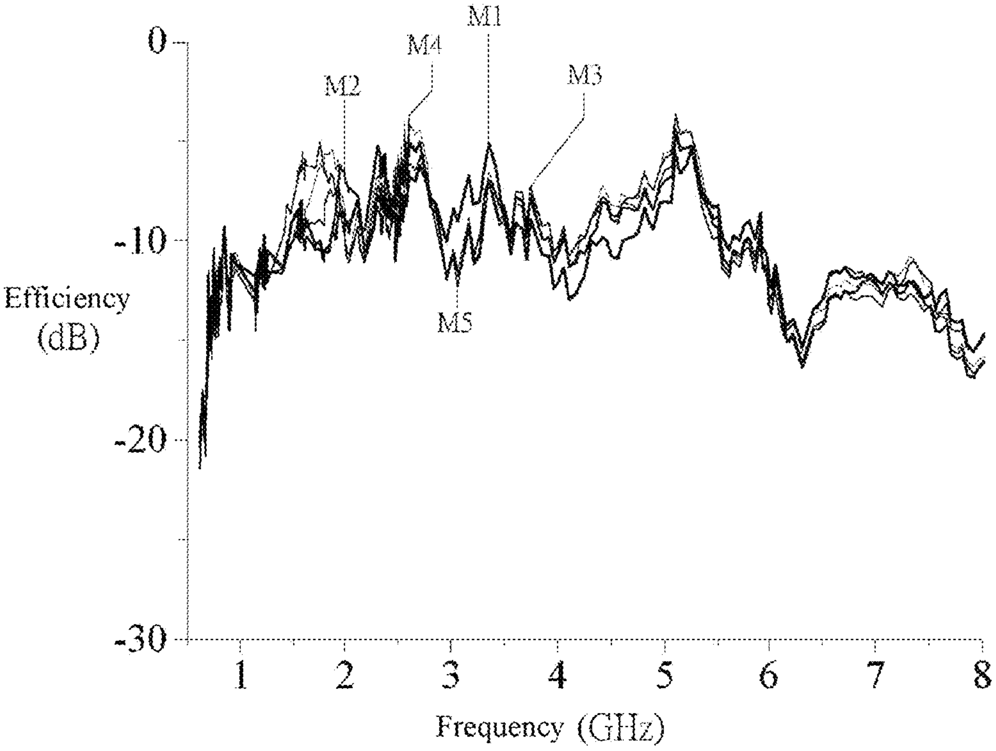
FIG. 6 is a schematic simulation diagram of radiation efficiency of a wideband antenna system from a first operating state to a fifth operating state according to an embodiment of the disclosure.

Referring to FIG. 4, FIG. 5, and FIG. 6 together, the wideband antenna system 10 of the disclosure overlaps the first metal radiation portion 12 and the second metal radiation portion 14 using the variable capacitor 241 in the impedance tuner 24, so that the variable capacitor 241 is equivalently connected in parallel to the coupling capacitor 30 to adjust coupling performance between the first metal radiation portion 12 and the second metal radiation portion 14. In an embodiment, the capacitance value of the variable capacitor 241 is 0.75 pF to 8.996 pF. In a first operating state M1, the capacitance value of the variable capacitor 241 is 0.8 pF, the first switch 242, the second switch 243, the third switch 244, and the fourth switch 245 are in the off state, and the aperture tuner 28 is switched to the open circuit ground path 361. In a second operating state M2, the capacitance value of the variable capacitor 241 is 3 pF, the first switch 242, the second switch 243, the third switch 244, and the fourth switch 245 are in the off state, and the aperture tuner 28 is switched to the open circuit ground path 361. In a third operating state M3, the capacitance value of the variable capacitor 241 is 5.1 pF, the first switch 242, the second switch 243, the third switch 244, and the fourth switch 245 are in the off state, and the aperture tuner 28 is switched to the open circuit ground path 361. In a fourth operating state M4, the capacitance value of the variable capacitor 241 is 9.1 pF, the first switch 242, the second switch 243, the third switch 244, and the fourth switch 245 are in the off state, and the aperture tuner 28 is switched to the open circuit ground path 361. In a fifth operating state M5, the capacitance value of the variable capacitor 241 is an infinite pF (a short circuit), the first switch 242, the second switch 243, the third switch 244, and the fourth switch 245 are in the off state, and the aperture tuner 28 is switched to the open circuit ground path 361. Simulation results are shown in FIG. 5 and FIG. 6. From the first operation state M1 to the fifth operation state M5, it is to be learned that a frequency band and an efficiency of an intermediate frequency band are controllable. Therefore, the wideband antenna system 10 supports the intermediate frequency band and the capacitance value of the variable capacitor 241 in the disclosure is adjusted to control the intermediate frequency band of the wideband antenna system 10.

Figure 7:
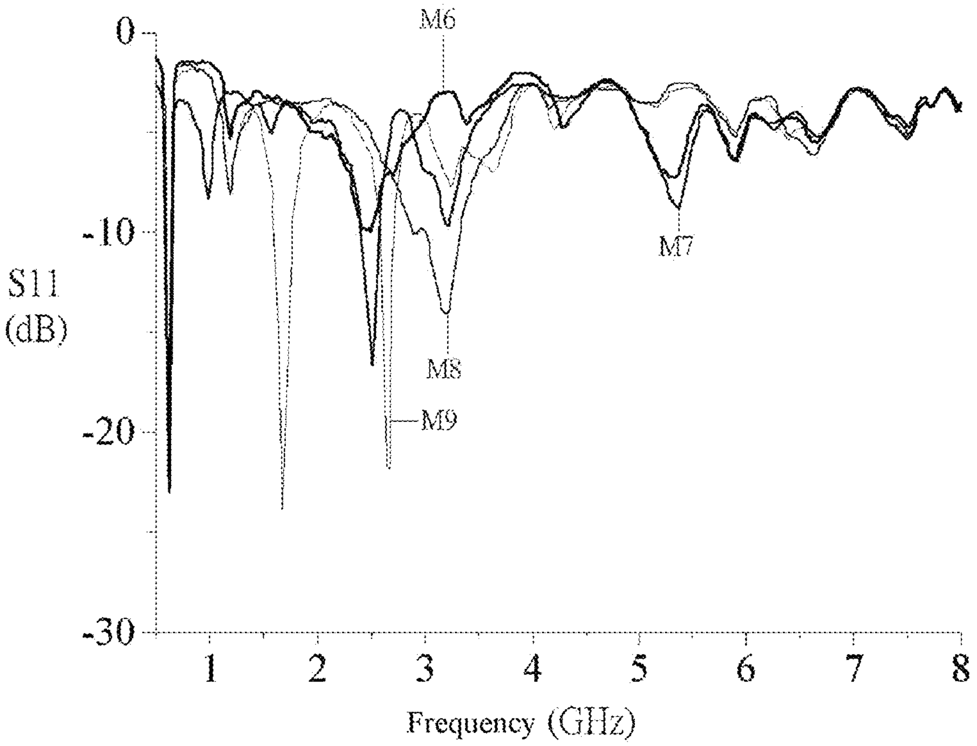
FIG. 7 is a schematic simulation diagram of an S-parameter of a wideband antenna system from a sixth operating state to a ninth operating state according to an embodiment of the disclosure.
Figure 8:
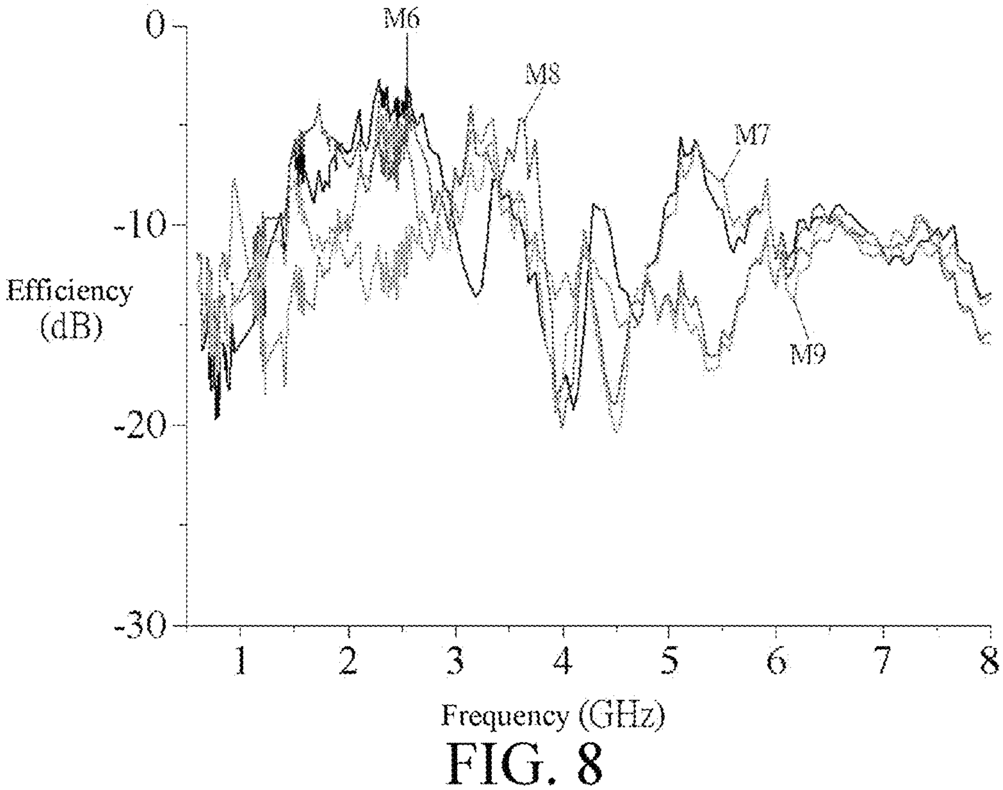
FIG. 8 is a schematic simulation diagram of radiation efficiency of a wideband antenna system from a sixth operating state to a ninth operating state according to an embodiment of the disclosure.

Referring to FIG. 4, FIG. 7, and FIG. 8 together, the wideband antenna system 10 switches the first metal radiation portion (main radiator) 12 and the second metal radiation portion (coupled radiator) 14 using the first switch 242, the second switch 243, the third switch 244, and the fourth switch 245 inside the impedance tuner 24. In a sixth operating state M6, the capacitance value of the variable capacitor 241 is 0.8 pF, the first switch 242 is in the off state, the second switch 243 is in the on state, the third switch 244 is in the off state, the fourth switch 245 is in the off state, and the aperture tuner 28 is switched to the open circuit ground path 361. In a seventh operating state M7, the capacitance value of the variable capacitor 241 is 0.8 pF, the first switch 242 is in the on state, the second switch 243 is in the on state, the third switch 244 is in the off state, the fourth switch 245 is in the off state, and the aperture tuner 28 is switched to the open circuit ground path 361. In an eighth operating state M8, the capacitance value of the variable capacitor 241 is 0.8 pF, the first switch 242 is in the on state, the second switch 243 is in the on state, the third switch 244 is in the on state, the fourth switch 245 is in the off state, and the aperture tuner 28 is switched to the open circuit ground path 361. In a ninth operating state M9, the capacitance value of the variable capacitor 241 is 0.8 pF, the first switch 242 is in the off state, the second switch 243 is in the on state, the third switch 244 is in the on state, the fourth switch 245 is in the off state, and the aperture tuner 28 is switched to the open circuit ground path 361. Simulation results are shown in FIG. 7 and FIG. 8. From the sixth operating state M6 to the ninth operating state M9, the efficiency of a high frequency band, an ultrahigh frequency band, and a WIFI 6E frequency band is improved. Therefore, the wideband antenna system 10 effectively supports the high frequency band, the ultrahigh frequency band, and the WIFI 6E frequency band.

Figure 9:
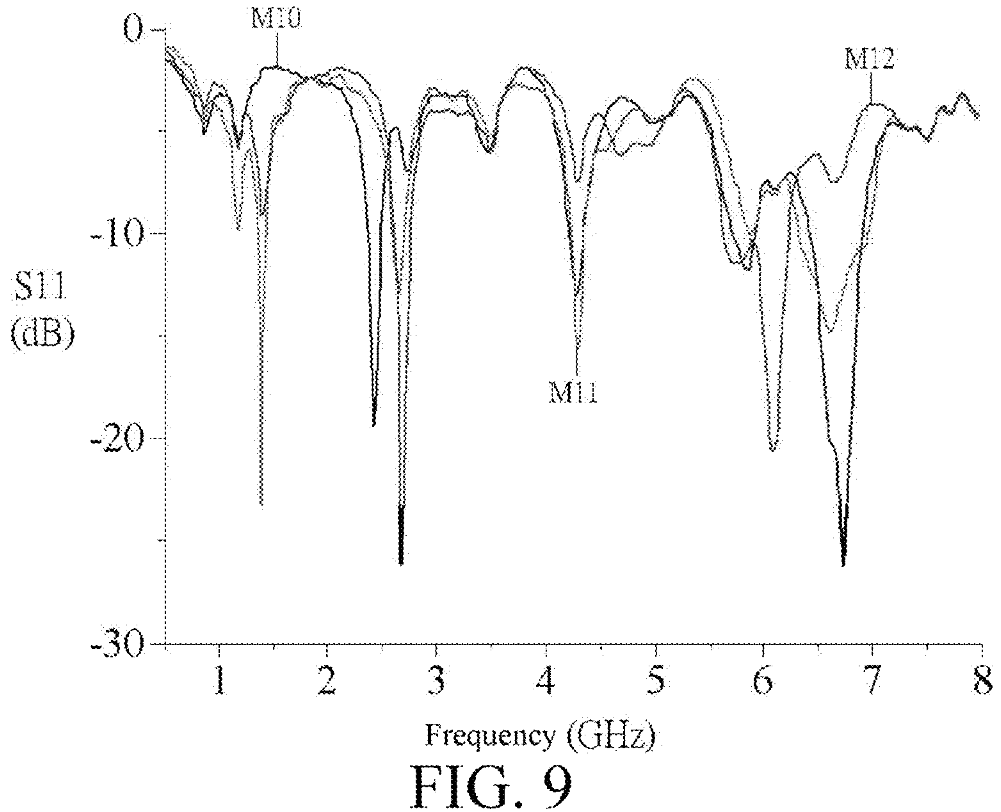
FIG. 9 is a schematic simulation diagram of an S-parameter of a wideband antenna system from a tenth operating state to a twelfth operating state according to an embodiment of the disclosure.
Figure 10:
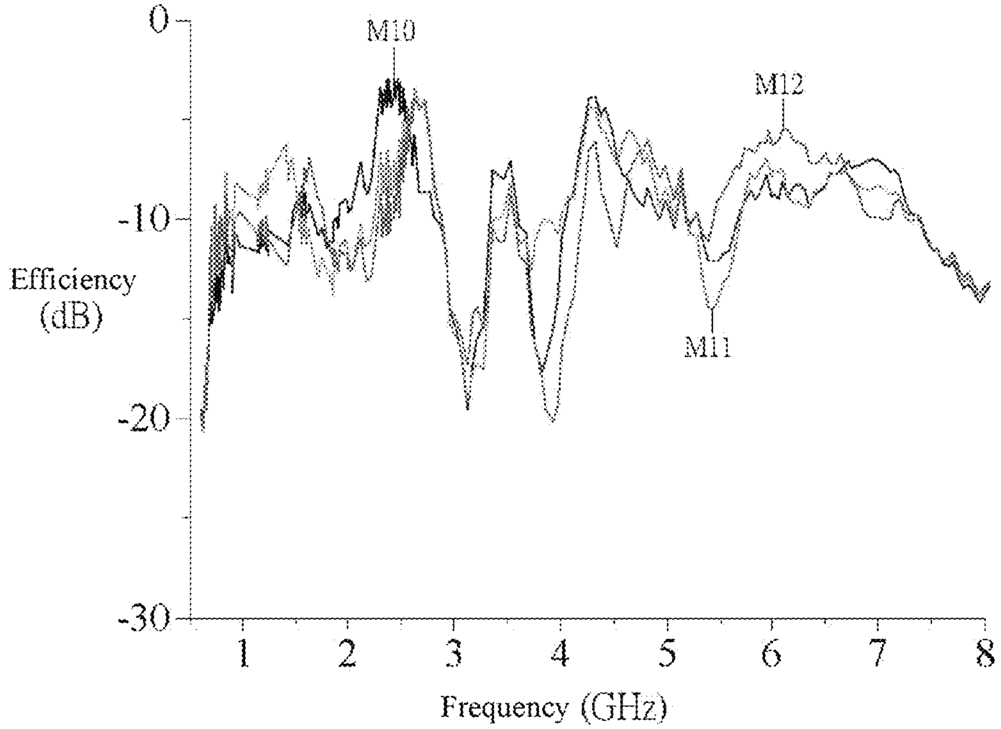
FIG. 10 is a schematic simulation diagram of radiation efficiency of a wideband antenna system from a tenth operating state to a twelfth operating state according to an embodiment of the disclosure.

Referring to FIG. 4, FIG. 9 and FIG. 10 together, the wideband antenna system 10 of the disclosure overlaps the second ground contact 22 and the first feeding contact 16 using the function of the fourth switch 245 in the impedance tuner 24, so that both the second ground contact 22 and the first feeding contact 16 are connected to the radio frequency signal source 32 to achieve a double-feeding antenna design. In a tenth operating state M10, the capacitance value of the variable capacitor 241 is 0.8 pF, the first switch 242 is in the off state, the second switch 243 is in the off state, the third switch 244 is in the off state, the fourth switch 245 is in the on state, and the aperture tuner 28 is switched to the open circuit ground path 361. In an eleventh operating state M11, the capacitance value of the variable capacitor 241 is 0.8 pF, the first switch 242 is in the on state, the second switch 243 is in the off state, the third switch 244 is in the off state, the fourth switch 245 is in the on state, and the aperture tuner 28 is switched to the open circuit ground path 361. In a twelfth operating state M12, the capacitance value of the variable capacitor 241 is 0.8 pF, the first switch 242 is in the off state, the second switch 243 is in the off state, the third switch 244 is in the on state, the fourth switch 245 is in the on state, and the aperture tuner 28 is switched to the open circuit ground path 361. Simulation results are shown in FIG. 9 and FIG. 10. From the tenth operating state M10 to the twelfth operating state M12, the second ground contact 22 is used as a feeding contact and cooperates with the first feeding contact 16, and the efficiency of the intermediate frequency band, the WIFI 5G frequency band, and the WIFI 6E frequency band is improved. Therefore, the wideband antenna system 10 effectively supports the intermediate frequency band, the WIFI 5G frequency band, and the WIFI 6E frequency band.

Figure 11:
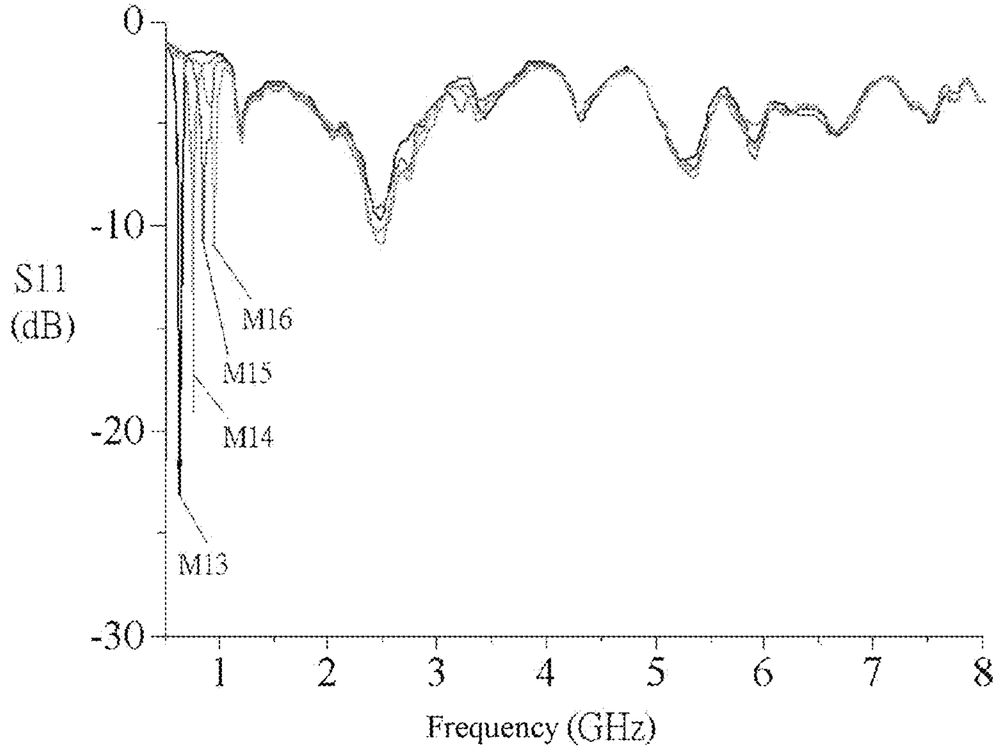
FIG. 11 is a schematic simulation diagram of an S-parameter of a wideband antenna system from a thirteenth operating state to a sixteenth operating state according to an embodiment of the disclosure.
Figure 12:
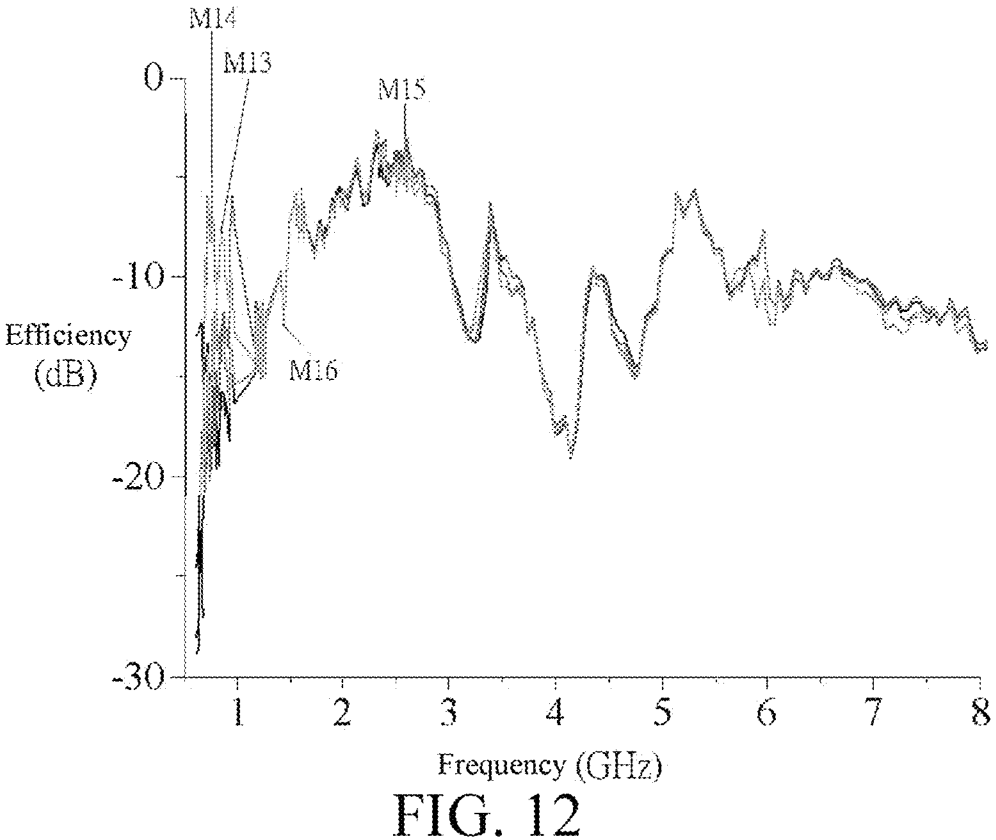
FIG. 12 is a schematic simulation diagram of radiation efficiency of a wideband antenna system from a thirteenth operating state to a sixteenth operating state according to an embodiment of the disclosure.

Referring to FIG. 4, FIG. 11 and FIG. 12 together, the wideband antenna system 10 switches a low frequency using the aperture tuner 28. In a thirteenth operating state M13, the capacitance value of the variable capacitor 241 is 0.8 pF, the first switch 242 is in the off state, the second switch 243 is in the on state, the third switch 244 is in the off state, the fourth switch 245 is in the off state, and the aperture tuner 28 is switched to the open circuit ground path 361. In a fourteenth operating state M14, the capacitance value of the variable capacitor 241 is 0.8 pF, the first switch 242 is in the off state, the second switch 243 is in the on state, the third switch 244 is in the off state, the fourth switch 245 is in the off state, and the aperture tuner 28 is switched to the passive component ground path 362, which uses a 22 nH inductor component. In a fifteenth operating state M15, the capacitance value of the variable capacitor 241 is 0.8 pF, the first switch 242 is in the off state, the second switch 243 is in the on state, the third switch 244 is in the off state, the fourth switch 245 is in the off state, and the aperture tuner 28 is switched to the passive component ground path 362, which uses a 7.5 nH inductor component. In a sixteenth operating state M16, the capacitance value of the variable capacitor 241 is 0.8 pF, the first switch 242 is in the off state, the second switch 243 is in the on state, the third switch 244 is in the off state, the fourth switch 245 is in the off state, and the aperture tuner 28 is switched to the passive component ground path 362, which uses a 3.9 nH inductor component. Simulation results are shown in FIG. 11 and FIG. 12. From the thirteenth operating state M13 to the sixteenth operating state M16, a radiation efficiency of the low frequency band is above a certain level and has a good performance. Therefore, the wideband antenna system 10 effectively supports the low frequency band and controls the low frequency band by adjusting the aperture tuner 28.

As shown in FIG. 1, in the disclosure, the impedance tuner 24 is connected in parallel to a breakpoint (coupling distance D1) between the first metal radiation portion 12 and the second metal radiation portion 14, to improve a bandwidth efficiency and an antenna efficiency using the first metal radiation portion 12 and the second metal radiation portion 14, and obtain a wideband effect in cooperation with the switching of the impedance tuner 24. The wideband antenna system 10 of the disclosure effectively supports all frequency bands such as the low frequency band, the intermediate frequency band, the high frequency band, the ultra-high frequency band, the WIFI 5G frequency band, and the WIFI 6E frequency band in cooperation with the function of the aperture tuner 28.

In summary, the disclosure is a wideband antenna system, which effectively uses an adjacent metal radiation portion as a wideband design, to make different use of the metal radiation portion according to requirements of different frequency bands, so that a good antenna radiation efficiency is provided in the supported frequency bands. Therefore, the wideband antenna system of the disclosure obtains a wide-band effect by circuit switching, which effectively supports a bandwidth of 617-7125 Mhz and provides good radiation efficiency, thereby reducing the quantity of antennas in electronic products.

The foregoing embodiments are merely for describing the technical ideas and the characteristics of the disclosure, and are intended to enable those skilled in the art to understand and hereby implement the content of the disclosure. However, the scope of claims of the disclosure is not limited thereto. In other words, equivalent changes or modifications made according to the spirit disclosed in the disclosure shall still fall into scope of the claims of the disclosure.

What is claimed is:

1. A wideband antenna system, comprising:

a first metal radiation portion;

a second metal radiation portion, wherein the second metal radiation portion has a coupling distance with the first metal radiation portion, so that there is a coupling capacitor between the first metal radiation portion and the second metal radiation portion;

a first feeding contact, electrically connected to the first metal radiation portion and close to the coupling distance, wherein the first feeding contact is electrically connected to a radio frequency signal source;

a second feeding contact, electrically connected to the second metal radiation portion and close to the coupling distance;

a first ground contact, electrically connected to the second metal radiation portion;

a second ground contact, electrically connected to the first metal radiation portion;

an impedance tuner, electrically connected to the first feeding contact, the second feeding contact, the first ground contact, the second ground contact, and the radio frequency signal source, to switch the first metal radiation portion and the second metal radiation portion;

an aperture contact, electrically connected to the first metal radiation portion, so that the second ground contact is located between the first feeding contact and the aperture contact; and an aperture tuner, electrically connected to the aperture contact.

2. The wideband antenna system according to claim 1, wherein the impedance tuner further comprises:

a variable capacitor, electrically connected to the first feeding contact and the second feeding contact;

a first switch, electrically connected between the first ground contact and a ground terminal to selectively connect the first ground contact to the ground terminal;

a second switch, electrically connected between the second ground contact and the ground terminal to selectively connect the second ground contact to the ground terminal;

a third switch, electrically connected between the second feeding contact and the ground terminal to selectively connect the second feeding contact to the ground terminal; and a fourth switch, electrically connected to the second ground contact and the radio frequency signal source to selectively connect the second ground contact to the radio frequency signal source, so that the second ground contact is used as a feeding contact.

3. The wideband antenna system according to claim 2, wherein the aperture tuner further comprises a plurality of ground paths to select one of the ground paths, wherein the ground path comprises at least one of an open circuit ground path and at least one passive component ground path, and a zero-ohm resistor ground path.

4. The wideband antenna system according to claim 3, wherein the first switch, the second switch, the third switch, and the fourth switch are in an off state; and when the aperture tuner is switched to the open circuit ground path, a capacitance value of the variable capacitor is adjusted to control an intermediate frequency band of the wideband antenna system.

5. The wideband antenna system according to claim 3, wherein the first switch and the third switch are in an on state or off state, the second switch is in the on state, and the fourth switch is in the off state; and when the aperture tuner is switched to the open circuit ground path, the wideband antenna system supports a high frequency band, an ultrahigh frequency band, and a WIFI 6E frequency band.

6. The wideband antenna system according to claim 3, wherein the first switch and the third switch are in an on state or off state, the second switch is in the off state, and the fourth switch is in the on state, so that the second ground contact is used as the feeding contact, and when the aperture tuner is switched to the open circuit ground path, the wideband antenna system supports an intermediate frequency band, a WIFI 5G frequency band, and a WIFI 6E frequency band.

7. The wideband antenna system according to claim 3, wherein the first switch, the third switch, and the fourth switch are in an off state, and the second switch is in an on state; and when the aperture tuner is switched to the open circuit ground path or the passive component ground path, the wideband antenna system supports a low frequency band, and the aperture tuner is adjusted to control the low frequency band.

8. The wideband antenna system according to claim 3, wherein the passive component ground path is a capacitor ground path, an inductor ground path, or a resistor ground path.

9. The wideband antenna system according to claim 3, wherein the aperture tuner further comprises a switch module, configured to selectively electrically connect to one of the ground paths.

10. The wideband antenna system according to claim 9, wherein the switch module is a single pole four throw (SP4T) switch, at least one single pole double throw (SPDT) switch, or a plurality of single pole single throw (SPST) switches.

11. The wideband antenna system according to claim 1, wherein a distance between the first feeding contact and the second ground contact is a distance of 0.05 to 0.025 times a wavelength of a lowest operating frequency.

* * * * *